(12) United States Patent
Camp, Jr.

(10) Patent No.: US 6,240,276 B1
(45) Date of Patent: *May 29, 2001

(54) COMPENSATING FOR ERRORS IN TUNING FREQUENCY OF A GLOBAL POSITIONING SATELLITE (GPS) RECEIVER

(75) Inventor: William O. Camp, Jr., Chapel Hill, NC (US)

(73) Assignee: Ericsson Inc., NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/066,956

(22) Filed: Apr. 28, 1998

(51) Int. Cl.$^7$ ...................................................... H04B 7/00
(52) U.S. Cl. ............................. 455/71; 455/502; 342/358
(58) Field of Search .............................. 455/71, 3.2, 430, 455/456, 352, 12.1, 502, 503, 70; 342/357, 357.06, 357.12, 358

(56) References Cited

U.S. PATENT DOCUMENTS

| | | | |
|---|---|---|---|
| 4,670,889 | * | 6/1987 | Hewitt ................................... 375/107 |
| 5,115,515 | * | 5/1992 | Yamamoto ............................. 455/71 |
| 5,249,305 | * | 9/1993 | Wieczorek .......................... 455/54.2 |
| 5,471,657 | * | 11/1995 | Gharpuray .......................... 455/12.1 |
| 5,663,735 | * | 9/1997 | Eshenbach ............................ 342/357 |
| 5,739,786 | * | 4/1998 | Greenspan ............................ 342/357 |
| 5,794,119 | * | 9/1998 | Evans ................................... 455/6.2 |
| 5,805,984 | * | 9/1998 | Tangen ................................... 455/71 |
| 5,940,027 | * | 8/1999 | Forseth ............................ 342/357.06 |

* cited by examiner

Primary Examiner—Daniel S. Hunter
Assistant Examiner—Nick Corsaro
(74) Attorney, Agent, or Firm—Burns, Doane, Swecker & Mathis, L.L.P.

(57) ABSTRACT

In a cellular communication system, positioning receiver disposed in a mobile station is tuned based on an reference frequency error transmitted from the base station. In accordance with the transmitted reference frequency error, the mobile station adjusts the tuning frequency of the positioning receiver. As a result, the GPS receiver locks onto the GPS satellite signals at a faster speed.

27 Claims, 3 Drawing Sheets

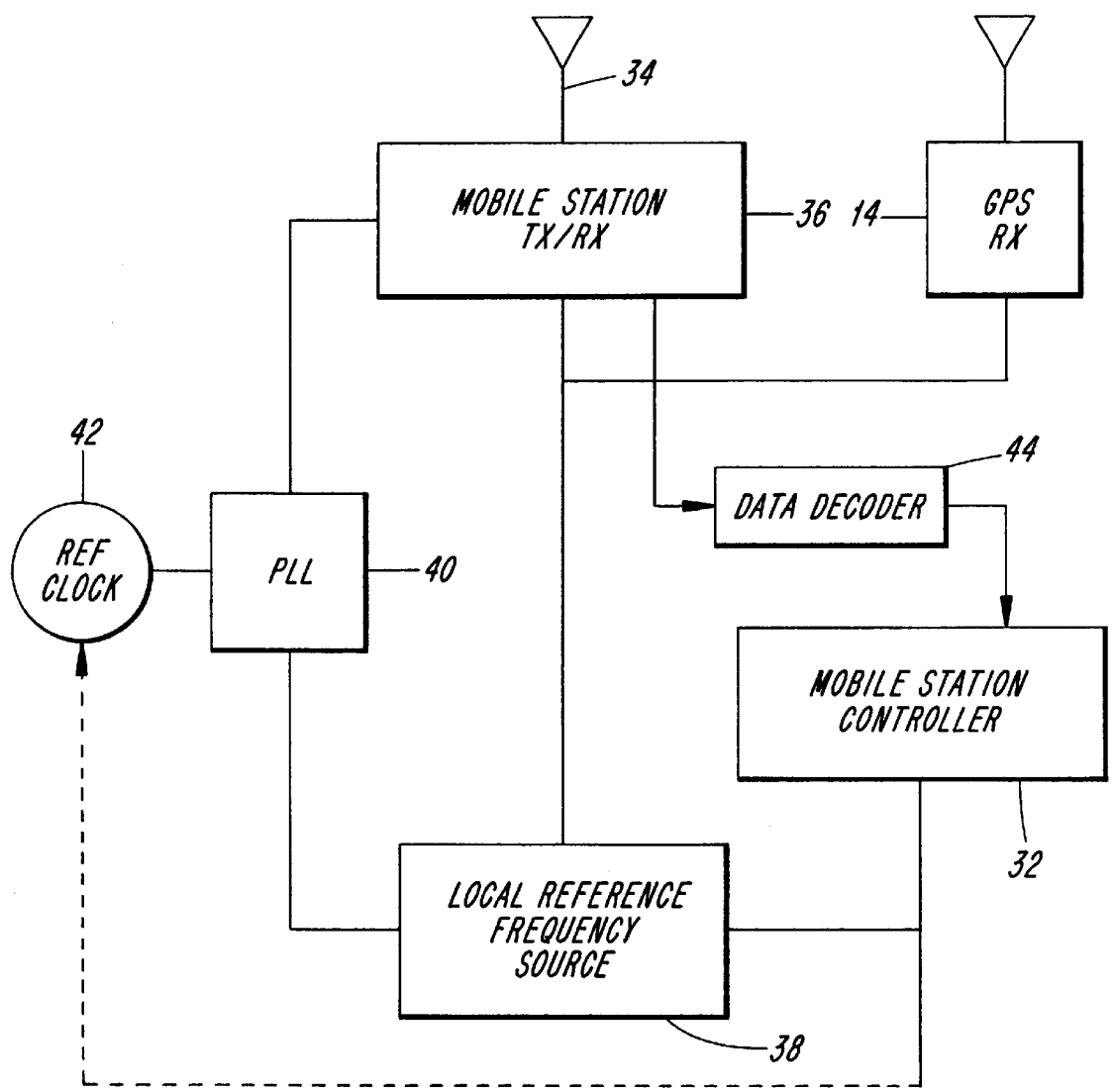

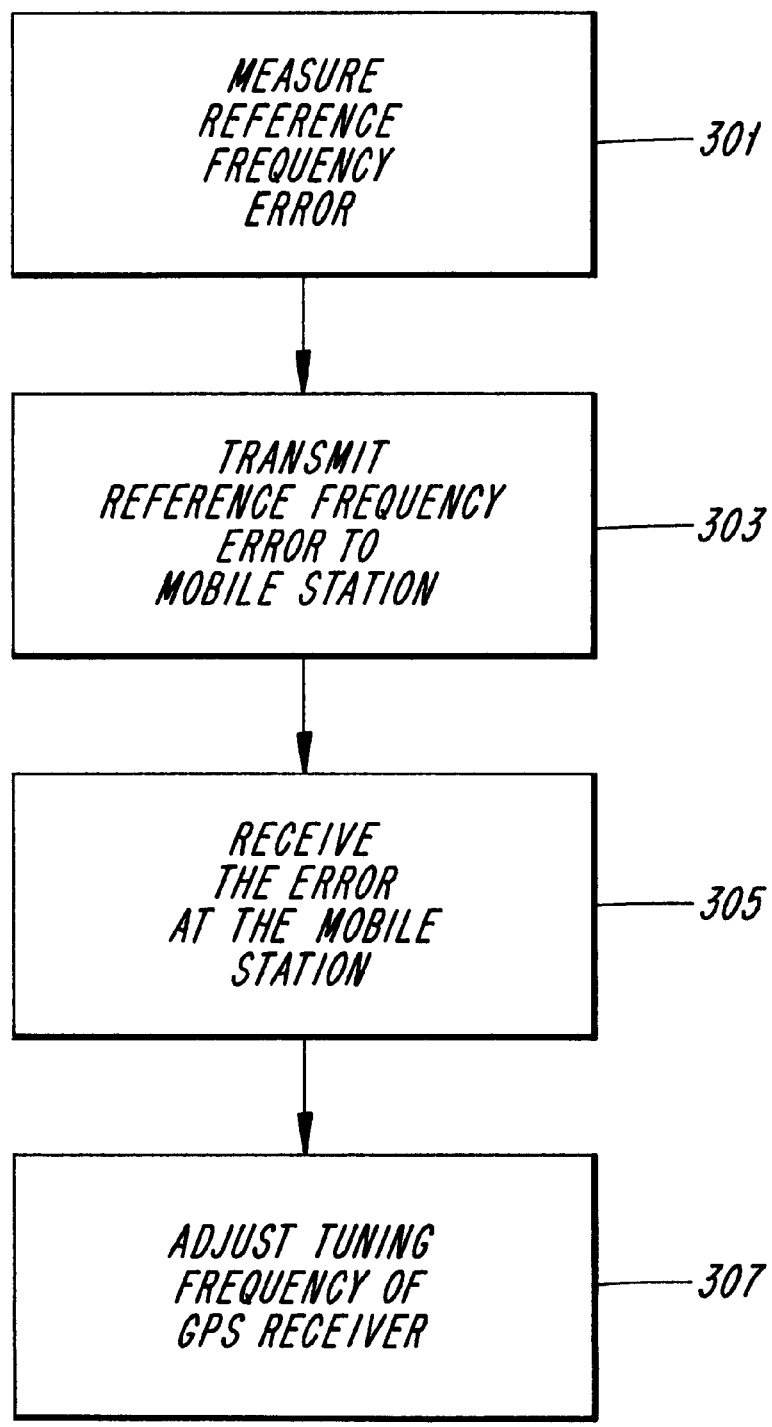

COMPENSATING FOR ERRORS IN TUNING FREQUENCY OF A GLOBAL POSITIONING SATELLITE (GPS) RECEIVER

This invention generally relates to the field of radio frequency (RF) communication, more particularly, to communicating position information using a Global Positioning Satellite (GPS) receiver.

The GPS system, which has 24 orbiting satellites, is gaining wide spread use in many positioning applications. In cellular communication systems that offer positioning services, GPS receivers are being incorporated in mobile stations to provide position information. The position information so provided can be used, for example, to locate the user of a mobile station during an emergency situation.

The GPS satellites transmit satellite signals periodically, every 1 msec, on a known radio frequency (RF) carrier. The satellite signals, which are direct sequence coded signals, specify the transmission time and the identity of the orbiting satellite. After receiving the satellite signals, a GPS receiver uses well known correlation technique to recover the coded information. By processing the coded information from at least four orbiting satellites, the GPS receiver determines the position information, which include latitude, longitude, and amplitude coordinates of a point where the satellite signals are received.

An important feature of a GPS receiver is the speed by which it determines the position information. This speed is directly related to the speed by which the GPS receiver locks onto the RF carrier of the satellite signals. As with other propagating waves, the satellite signals are subject to doppler frequency shifts. It is well known that if the doppler frequency shifts are compensated for, the GPS receiver can lock onto the RF carrier at a faster speed. In this way, weak satellite signals may be detected more quickly.

In order to quickly lock onto the RF carrier, the GPS receiver must be tuned by an accurate reference frequency. For most positioning applications, a reference frequency accuracy of about +/−0.1 ppm is desired. Some conventional solutions rely on expensive local oscillator arrangements for providing such an accurate reference frequency.

In existing cellular systems, a mobile station generates a local reference frequency by locking onto RF signals that are received from a base station. Some of the base stations of existing cellular systems, for example, AMPS systems, however, do not have an accurate reference frequency. Although very stable, the reference frequency of the base station may have +/−1.5 ppm inaccuracy. Therefore, the local reference frequency of the base station, which is generated based on the reference frequency, becomes inaccurate. Because of such inaccuracy, a mobile station's GPS receiver is tuned with a tuning frequency error, which increases the time needed to lock onto the RF carrier. Consequently, the inaccuracy of the reference frequency reduces the speed by which the position information are determined.

Also, in order to perform longer coherent correlations of the GPS signal, for example, when receiving weaker signals (such as indoors), it is required that the doppler frequency be compensated more accurately. Therefore, there exists a need for providing position information more quickly, despite inaccuracies associated with the reference frequency of a cellular system.

SUMMARY

Briefly, the present invention is exemplified in a communication system that compensates for tuning frequency error of a positioning receiver by transmitting a measured reference frequency error from a base station to a mobile station. According to the invention, the positioning receiver, which is incorporated in the mobile station, is responsive to the transmitted reference frequency error, to quickly lock onto the RF carrier of a positioning signal.

The base station includes a reference frequency source that generates a reference frequency for communicating RF signals with the mobile station. A base station transmitter transmits the reference frequency error, which is measured based on the reference frequency and a known frequency, to the mobile unit. The reference frequency error transmission may be periodic or based on a request from the mobile station. The mobile station includes a receiver that receives the reference frequency error. The mobile station adjusts the tuning frequency of the positioning receiver according to the reference frequency from the base station RF signal and the reference frequency error, thereby compensating for frequency error in the base station reference frequency.

According to some of the more detailed features of the invention, the base station includes an external frequency source that generates the known frequency using an accurate frequency source. Under this arrangement, the base station includes a discriminator that generates the frequency error based on the difference between the reference frequency and the known frequency. In an exemplary arrangement, the external frequency source is another positioning receiver, preferably located at the base station, that is tuned using the reference frequency. The mobile station includes a local reference frequency source that generates a local reference frequency, which is adjusted based on the reference frequency error. Alternatively, the mobile unit includes a phase lock loop (PLL) having a reference clock for generating the local reference frequency. Under this arrangement, the reference clock is adjusted based on the reference frequency error.

According to another aspect of the invention, a method for receiving position information in a positioning receiver includes measuring a reference frequency error relative to a known frequency. In an exemplary embodiment, the reference frequency error may be measured using a frequency counter at the base station. Then, the reference frequency error is transmitted from the base station to the mobile station. The positioning receiver is tuned based on the reference frequency error to quickly lock onto positioning signals.

A further alternative simply locks the frequency of the positioning receiver to a reference signal from the mobile station that in turn has been phase locked, to the base station signal. The positioning receiver uses the received reference frequency error to adjust doppler shifts according to the amount of reference frequency error.

Other features and advantages of the present invention will become apparent from the following description of the preferred embodiment, taken in conjunction with the accompanying drawings, which illustrate, by way of example, the principles of the invention.

BRIEF DESCRIPTION OF THE DRAWINGS

FIG. 2 is a block diagram of a mobile station used in the positioning system of FIG. 1.

FIG. 3 is a flow chart of the steps taken for receiving position information according to the present invention.

DETAILED DESCRIPTION

Figure 1:
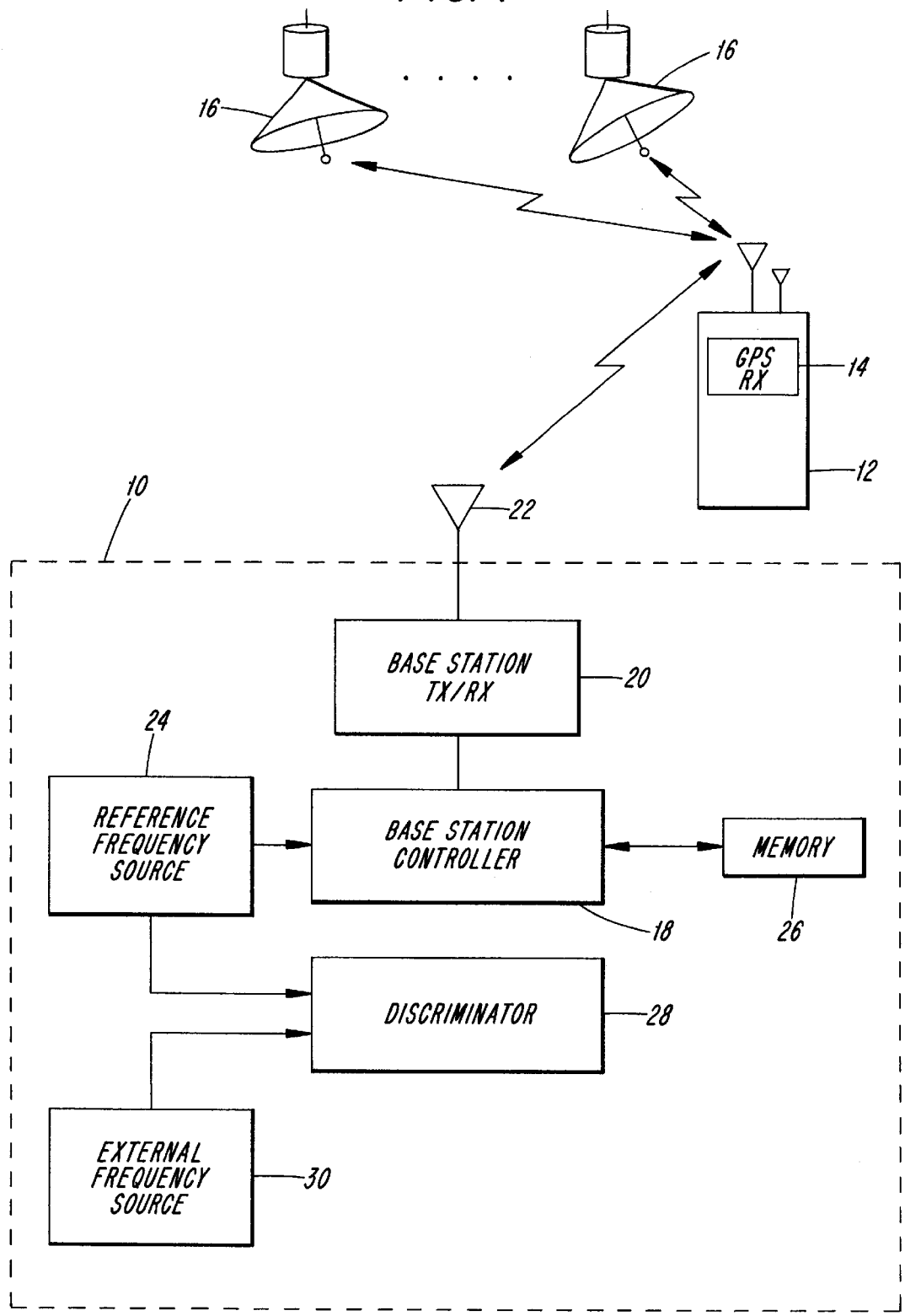
FIG. 1 is a block diagram of a positioning system according to the present invention.

Referring to FIG. 1, a block diagram of a base station 10, which communicates with a mobile station 12 in a positioning system according to the present invention is shown. Preferably, the base station 10 and the mobile station 12 are part of a cellular communication system, such as one based on well known AMPS standard. The mobile station 12 includes a GPS receiver 14 that receives satellite signals from orbiting GPS satellites 16, to determine the position of the mobile station 12. The base station 10, which is operated under the control of a base station controller 18, includes a transceiver block 20 that communicates with the mobile station 12 via an antenna 22. A reference frequency source 24 generates a reference frequency that is used for communicating RF signals with the mobile station 12. The reference frequency is used to tune the transceiver block 20, when receiving and transmitting signals to and from the mobile station 12. As described before, the GPS receiver 14 is tuned by a local reference frequency, which is generated by locking onto RF signals transmitted from the base station 10. If not corrected, the reference frequency error, reduces the speed by which the GPS receiver 14 locks onto the RF carrier of the satellite signals.

According to the present invention, the base station 10 transmits a measured reference frequency error to the mobile station 12. Preferably, the reference frequency error is derived by measuring the difference between the reference frequency and a known frequency. In one embodiment of the invention, the reference frequency error may be measured periodically (every day or every month), for example, using a well known frequency counter (not shown). In this way, the result of the frequency error measurement is stored in a memory 26, for later transmission to the mobile station 12. Using a predefined messaging protocol, the base station 10 transmits the reference frequency error as an encoded message, which is generated by a data encoder 27 to all of the mobile stations operating within a corresponding cell along with other information useful for GPS signal processing. An example of a method for transmitting this data without modifying the AMPS cellular system in any way would be to use a DTMF encoder. Once received, the mobile station 12 tunes the GPS receiver 14 according to the transmitted reference frequency error. As a result, the GPS receiver 14 accurately accounts for the doppler shifts of the satellite signals and quickly locks on to the RF carrier of the satellite signals.

In another embodiment of the invention, a discriminator block 28 measures the reference frequency error relative to an external and accurate frequency source 30. Such external and accurate frequency sources may include the AM, FM and TV signals and the various time signals (WWV, CHU, etc.), which are set to cesium clocks at their corresponding transmitter sites. In an exemplary embodiment, the external frequency source 30 may be derived from another GPS receiver (shown as the reference frequency source 24) that is incorporated into the base station 10 for providing differential position information relative to the mobile station 12. Under this arrangement, the base station's GPS receiver is phase locked with the reference frequency, duplicating the function of the GPS receiver 14 at the mobile station 12. The base station's GPS receiver locks onto the RF carrier over a multiplicity of satellite signals, and therefore, multiplicity of doppler frequencies. In this way, the base station 10 determines a measured external frequency reference 30. The difference between the measured external frequency reference 30 and the reference frequency source 24 is a measure of the reference frequency error. The base station transmits the measured reference frequency error along with other encoded messages to the mobile station 12.

Referring to FIG. 2, a block diagram of the mobile station 12 is shown. The mobile station 12, which operates under the control of a mobile station controller 21, receives and transmits RF signals to and from the base station 10 through an antenna 34. A phase locked loop (PLL) block 40 having a reference clock 42 locks onto an RF signal received from the base station 12. Once locked, a local reference frequency source 38 generates a local reference frequency that is used for tuning the GPS receiver 14 and a mobile station transceiver block 36. The transceiver block 36 recovers the encoded messages transmitted from the base station 10, including the transmitted reference frequency error.

In a well known manner, a data decoder 44, such as a DTMF decoder decodes the recovered encoded messages and applies them to the mobile station controller 32 for processing. The mobile station controller 32 uses a reference frequency error value that corresponds to the transmitted reference frequency error to adjust the tuning frequency of the GPS receiver 14. In an exemplary embodiment, the reference frequency error may be used to adjust or offset the local reference frequency. Alternatively, the reference frequency error may be used to adjust or offset the clock frequency of the PLL block 40. Also, the reference frequency error may be used to shift the frequency of a GPS gold code generator that is incorporated in a hardware correlator (not shown) of the GPS receiver 14, or to shift the IF frequency of the GPS receiver, before it is processed in the correlator. Accordingly, the GPS receiver 14 becomes responsive to the reference frequency error for receiving the satellites signal, thereby quickly locking onto the RF carrier.

Referring to FIG. 3, a flow chart of the steps taken for receiving position information according to another aspect of the invention is shown. In a block 301, a reference frequency error is measured. As described above, the measurement may be made using a frequency counter or an external and accurate frequency source, such as one derived from the GPS receiver of the base station 10. Using a messaging protocol, the reference frequency error is transmitted to the mobile station 12, block 303. The messaging protocol suitably encodes the reference frequency error for decoding by the mobile station 12. For example, in an AMPS communication system, the reference frequency error may be encoded using an extended message protocol and transmitted over a control channel. Alternatively, the reference frequency error may be encoded as a sequence of DTMF digits that is transmitted over a voice channel.

The reference frequency error may be transmitted along with other GPS signal processing parameters, such as, satellites in view, expected doppler frequencies for each satellite, corrected ephemeris data, etc. As with the reference frequency error, the GPS signal processing parameters may be transmitted periodically or based on a request from the mobile station 12. The transmitted reference frequency error is received by the mobile station 12, block 305. Based on the reference frequency error, the GPS receiver 14 is tuned to quickly lock onto the RF carrier of the GPS satellite signals, block 307.

From the foregoing description it will be appreciated that by transmitting the reference frequency error and adjusting the tuning frequency of a GPS receiver in accordance therewith, the time for locking onto the RF carrier of a GPS satellite signals is reduced. In this way, the present invention substantially increases the speed by which position information are determined at the mobile station, without using expensive local oscillator circuitry.

Although the invention has been described in detail with reference only to the presently preferred embodiment, those skilled in the art will appreciate that various modifications can be made without departing from the invention. Accordingly, the invention is defined only by the following claims which are intended to embrace all equivalents thereof.

What is claimed is:

1. A method for receiving position information in a positioning receiver, comprising:
   generating a first reference signal at a base station;
   receiving a known frequency from an external frequency source that is not a mobile station:
   measuring a reference frequency error associated with a difference between said first reference signal and said known frequency;
   transmitting the reference frequency error from a base station to a mobile station; and
   tuning the positioning receiver in accordance with the reference frequency error.

2. The method of claim 1, wherein the reference frequency error is measured using a frequency counter.

3. The method of claim 1, wherein the known external frequency corresponds to the carrier frequency of a global positioning system.

4. The method of claim 1, wherein the positioning receiver is tuned by adjusting a local reference frequency generated by the mobile station.

5. The method of claim 1, wherein the reference frequency error is transmitted periodically.

6. The method of claim 1, wherein the reference frequency error is transmitted upon a request from the mobile station.

7. A communication system, comprising:
   a base station including:
      a reference frequency source that generates a reference frequency for communicating RF signals within the communication system; and
      a transmitter that transmits a reference frequency error that is based on the reference frequency and a known frequency, wherein said reference frequency error is determined without any signal from a mobile station; and
   a mobile station including:
      a receiver that receives the reference frequency error; and
      a positioning receiver that is responsive to the reference frequency error for receiving a positioning signal having a known RF carrier.

8. The communication system of claim 7, wherein the base station further includes an external frequency generator that generates the known frequency using an accurate frequency source.

9. The communication system of claim 8, wherein the base station further includes a discriminator that generates the frequency error based on the difference between the reference frequency and the known frequency.

10. The communication system of claim 7, wherein the known frequency corresponds to the carrier frequency of a global positioning system.

11. The communication system of claim 7, wherein the base station includes a GPS receiver that is tuned using the reference frequency, for providing the reference frequency error.

12. The communication system of claim 7, wherein the mobile station generates a local reference frequency that is used for tuning the positioning receiver, and wherein the local reference frequency is adjusted based on the reference frequency error.

13. The communication system of claim 12, wherein the mobile station includes a phase lock loop (PLL) having a reference clock for generating the local reference frequency, wherein the reference clock is adjusted based on the reference frequency error.

14. The communication system of claim 7, wherein the base station transmits the reference frequency error periodically.

15. The communication system of claim 7, wherein the base station transmits the reference frequency error upon a request from the mobile station.

16. In a communication system that includes a mobile station which incorporates a positioning receiver that is tuned to receive positioning signals, a base station comprising:
   a reference frequency source that generates a reference frequency for communicating RF signals within the communication system;
   a receiver that receives a known frequency from an external frequency source that is not the mobile station; and
   a transmitter that transmits to the mobile station a reference frequency error based on the reference frequency and said known frequency, for adjusting the tuning of the positioning receiver.

17. The base station of claim 16 further including an external frequency generator that generates the known frequency using on an accurate frequency source.

18. The base station of claim 17 further including a discriminator that generates the frequency error based on the difference between the reference frequency and the known frequency.

19. The base station of claim 16 further including a GPS receiver that is tuned using the reference frequency, for providing the reference frequency error.

20. The base station of claim 16, wherein the known frequency corresponds to the carrier frequency of a global positioning system.

21. In a communication system that includes a base station for communicating with mobile stations, a mobile station comprising:
   a receiver that receives a reference frequency error from the base station, said reference frequency error based on a reference frequency generated by said base station, wherein said reference frequency error is determined without any input signal from the mobile station; and
   a positioning receiver that is responsive to the reference frequency error for receiving a positioning signal having a known RF carrier.

22. The mobile station of claim 21 further including a local oscillator that generates a local reference frequency that is used for tuning the positioning receiver, and wherein the local reference frequency is adjusted based on the reference frequency error.

23. The mobile station of claim 22 further including a phase lock loop (PLL) having a reference clock for generating the local reference frequency, wherein the frequency of the reference clock is adjusted based on the reference frequency error.

24. The mobile station of claim 21, wherein the known frequency corresponds to the carrier frequency of a global positioning system.

25. A communication system, comprising:
   an external frequency source that is not a mobile station and provides a first reference frequency;
   a base station including:

a reference frequency source receiver that provides a second reference frequency that is not based on a carrier signal from a mobile station; and a transmitter that transmits a reference frequency error that is based on a difference between the first reference frequency and the second reference frequency to a mobile-station; and the mobile station including:

a receiver that receives the reference frequency error; and a positioning receiver that is responsive to the reference frequency error for receiving a positioning signal having a known RF carrier.

26. A method for compensating errors in tuning a frequency of a positioning receiver that does not require any input from a mobile station, comprising the steps of:

generating a first reference frequency at a base station;

generating a second reference frequency at an external source using an accurate frequency source that is not a mobile station;

determining a reference frequency error based on the difference between the first reference frequency and the second reference frequency;

transmitting the reference frequency error from the base station to the mobile station; and tuning the positioning receiver in accordance with the reference frequency error.

27. The method of claim 1, wherein the step of measuring the reference frequency error does not require any input from the mobile station.

* * * * *